United States Patent

Yajima et al.

[11] Patent Number: 5,929,907
[45] Date of Patent: Jul. 27, 1999

[54] AUTOMATIC FOCUSING APPARATUS USING SCANNING LINE WEIGHTING OF A VIDEO SIGNAL TO DETERMINE AN IN-FOCUS CONDITION

[75] Inventors: Masao Yajima; Kazuo Higashiura, both of Shimosuwa-machi, Japan

[73] Assignee: Sankyo Seiki Mfg. Co., Ltd., Nagano-ken, Japan

[21] Appl. No.: 08/697,429

[22] Filed: Aug. 23, 1996

Related U.S. Application Data

[63] Continuation of application No. 08/578,380, Dec. 26, 1995, abandoned, which is a continuation of application No. 08/276,059, Jul. 15, 1994, abandoned, which is a division of application No. 07/868,778, Apr. 15, 1992, Pat. No. 5,357, 280.

[30] Foreign Application Priority Data

Apr. 17, 1991 [JP] Japan .................................. 3-85286

[51] Int. Cl.$^6$ ...................................................... G03B 13/00
[52] U.S. Cl. ............................................ 348/351; 348/349
[58] Field of Search .................................. 348/335, 345, 348/347, 349, 79, 80; 359/656

[56] References Cited

U.S. PATENT DOCUMENTS 3,816,651  6/1974  Gardner .................................. 348/80 X
4,829,374  5/1989  Miyamoto et al. ...................... 348/79

*Primary Examiner*—Tuan V. Ho
*Attorney, Agent, or Firm*—McAulay Nissen Goldberg Kiel & Hand, LLP

[57] ABSTRACT

An automatic focusing apparatus to be used for an optical system comprises an image pickup device for picking up an image of the subject supported on a support by way of the optical system and transmitting video signals for the subject, an extracting device for extracting only the video signals corresponding to the pitch of movement of focus adjustment from the signals transmitted from the image pickup device and an in-focus state detecting device for determining the in-focus position of the subject with the area for in-focus detection determined by the pitch setting device and a drive for moving either the support or the optical system for focus adjustment depending on the result of detection of the in-focus state detecting device.

6 Claims, 14 Drawing Sheets

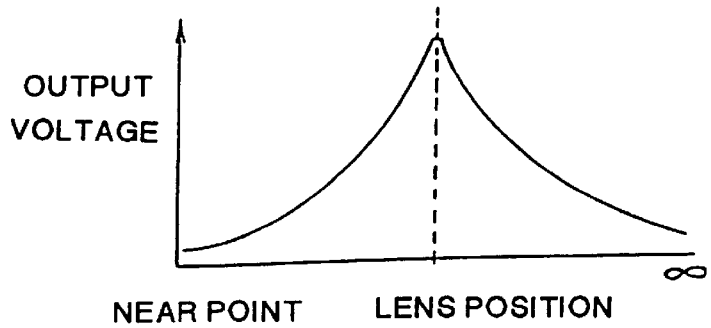
FIG. 7
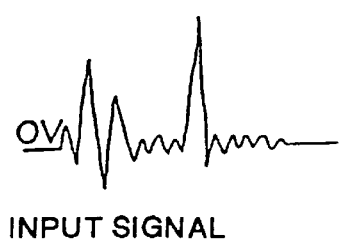
FIG. 8a
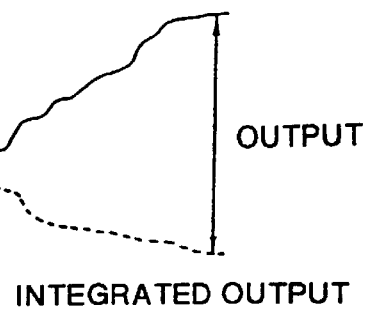
FIG. 8b
FIG. 8c
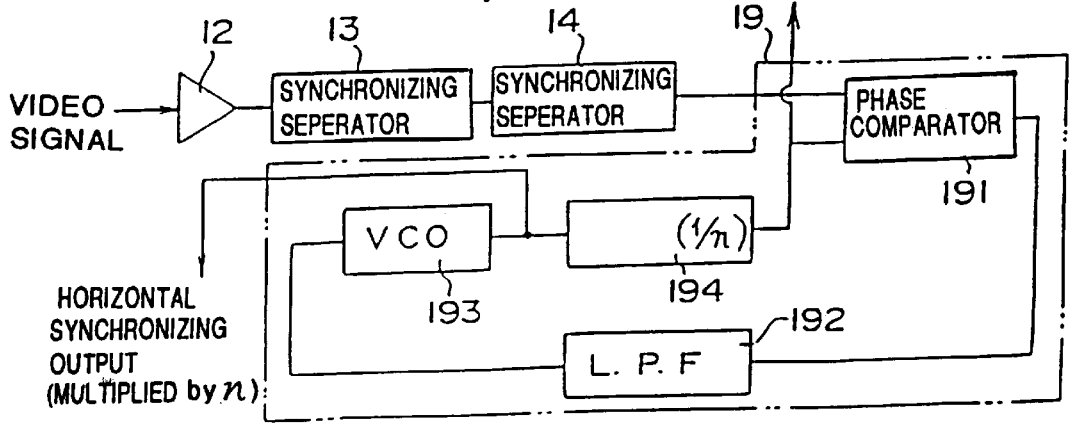
FIG. 9

AUTOMATIC FOCUSING APPARATUS USING SCANNING LINE WEIGHTING OF A VIDEO SIGNAL TO DETERMINE AN IN-FOCUS CONDITION

This is a continuation of application Ser. No. 08/578,380 filed Dec. 26, 1995, abandoned which, in turn, is a continuation of Ser. No. 08/276,059 filed Jul. 15, 1994, abandoned which, in turn, is a divisional of Ser. No. 07/868,778 filed Apr. 15, 1992 U.S. Pat. No. 5,357,280.

BACKGROUND OF THE INVENTION a) Field of the Invention

This invention relates to an automatic focusing apparatus to be used for a television camera or another optical apparatus.

b) Prior Art

A known technique for automatically detecting signals representing an object in-focus (hereinafter referred to as in-focus signals) utilizes the frequency transmission characteristics of the camera lens of a camera and high frequency components of video signals. With this technique, a specific portion of the scanning lines of the video signal obtained by the camera lens for a particular scene is selected and the high frequency component of that portion is removed by means of a high pass filter (hereinafter referred to as HPF) so that the peak value of the high frequency component may be held by a peak-hold circuit to detect the amount of the high frequency component. Since the output voltage of the peak-hold circuit reaches a maximum when the lens system of the camera is focused on the subject to be taken by the camera, the focusing position of the lens system can be determined by detecting the maximum output voltage of the peak-hold circuit.

However, problems arise using such a technique. Firstly, there is no way of knowing in which direction the lens needs to be moved for better focusing when the output voltage of the peak-hold circuit becomes apparent only for a part of the focused area. Secondly, no exact focusing can be achieved when the output voltage reflects a saturated condition or the peak is rather dull and, if such is the case, only a blurred image can be produced by the camera. In an attempt to avoid these problems, the applicant of the present patent application has devised an automatic focusing apparatus comprising a plurality of HPFs having different cut-off frequencies and means for detecting in-focus signals by selectively weighting the outputs of the HPFS. (See Japanese Patent Laid-Open No. 62-60369.) An improved automatic focusing apparatus of the above described type proposed by the inventor of the present invention further comprises a microcomputer for arbitrarily determining an area in the view finder of a camera for detecting in-focus signals. (See Japanese Patent Laid Open No. 63-253773.)

Any known automatic focusing apparatus requires that a specific area is predetermined for detection of in-focus signals in the view finder of a camera corresponding to the subject to be shot by the camera so that in-focus signals may be detected from the video signals of the camera only for the area. The automatic focusing apparatus as disclosed in Japanese Patent Laid-Open No. 63353773 as cited above further comprises for this purpose a counter for counting the number of reference pulses from an oscillator during the active period of a horizontal synchronizing signal from zero, a pair of latch circuits t1 and t2 for latching respective timing data t1 and t2 from the microcomputer, a pair of comparators for comparing the latched timing data t1 and t2 with the reading of the counter and transmitting output signals with the respective timing data t1 and t2 and a gate signal generating circuit for generating the outputs of the comparators as gate signals and predetermining the t1 and t2 as detection areas. These t1 and t2 data are used to horizontally limit the detection areas and consequently the effective areas of scanning lines in order to determine an area for detection of in-focus signals.

c) Problems to be Solved by the Invention

Since any of the known apparatuses as described above requires a sample-hold circuit for each scanning line from which in-focus signals are extracted, the overall size of the aggregate of such apparatuses can become very large if a large number of scanning lines are involved. Besides, the analog adder used for selectively weighting and adding outputs of a plurality of HPFs having different characteristics is accompanied by the problem of difficulty of modifying weighting factors when the number of HPFs is large and that of saturation of the adder when the number of related scanning lines is large.

The reference pulses generated by the oscillator are not correlated with the horizontal synchronizing signals involved and, therefore, the span of scanning can be accidentally displaced by a single pulse. Difference of frequency of horizontal synchronizing signals among cameras can also give rise to displacement of the span of scanning.

Moreover, since peak values of output signals of HPFs are used as in-focus signals, the peak of an in-focus signal, which is normally pointed and moved depending on the lens position, can become flattened and/or saturated to blur the focused point. Because a spot showing the strongest contrast an a scene is judged to be the focused point, a foreign object such as a piece of dust located by chance near the subject to be focused can produce a strong contrast and mistakenly be focused in place of the subject. When the subject to be shot by the camera is a flat and low contrast item such as a semiconductor chip pattern, the in-focus signal obtained from the subject can be flat and the focusing operation can become rather inaccurate. With a subject having a curved surface and showing a strong reflection of light outside the focused area, as in the case of a piece of metal, the surface area showing a strong contrast can be easily focused.

Transient noise can be produced at the rising edge of the video signal passing through the gate when the gate of a camera is opened by a gate signal. Transient noise can also be produced in a similar manner at the falling edge of the video signal passing through the gate when the gate is closed to block passage of video signals and these noises can adversely affect the operation of in-focus signals. FIG. 10 of the accompanying drawings shows how an embodiment of the present invention operates and also the above described problems of the prior art. According to a prior art camera of the type in question, a video output signal produced only for a limited area specified by the gate from a corresponding video input signal and, therefore, transient noise Tn appears at the rising and falling edges of a video signal for the area specified by the gate due to the transient phenomenon. While each video output signal is used to detect the position in-focus in a scene after passing through HPFs, a peak-hold circuit and other components, any transient noise Tn contained in the video output signal can affect the output of the HPFs in such a manner that the output of the peak-hold circuit may become different from the signal representing the contrast of the original video output signal and consequently the accuracy of focusing may deteriorate.

Where an automatic focusing apparatus of an optical system comprising an objective lens and a tube body to shoot a work is involved, the positional relationship of the in-focus condition detecting section of the apparatus and the drive motor is controlled by utilizing the magnification of the objective lens (or the overall optical system) and the minimum pitch of movement of the translation table, meaning that the section requires replacement depending on the application of the optical system and therefore such an apparatus has little flexibility in terms of applicability. Besides, the translation table can have backlash to an unignorable extent so as to bring the work to be shot by the optical system out of focus. Finally, the positional relationship between the work and the automatic focusing apparatus can be different from that of the work and the observer in terms of optical focusing.

d) Objects to be Achieved by the Invention

It is therefore an object of the present invention to provide a compact automatic focusing apparatus having a simplified overall configuration, free from saturation of its adder and capable of easily modifying the weighting factor of each scanning line whenever necessary by feeding the CPU with data generated each time an in-focus signal is obtained from the scanning lines to be examined for focusing.

Another object of the present invention is to provide an automatic focusing apparatus capable of getting rid of any unduly high influence of strongly contrasted portions in the field shot by the optical system and obtaining highly accurate in-focus signals even when the overall contract of the field shot by the optical system is low.

Still another object of the present invention is to provide an automatic focusing apparatus free from transient noises contained in video output signals and having an improved focusing accuracy.

Still another object of the present invention is to provide an automatic focusing apparatus capable of avoiding any displacement of the span of scanning by making the phase of the reference signal agree with that of the horizontal synchronizing signal.

A further object of the present invention is to provide an automatic focusing apparatus that has flexibility in terms of applicability and can eliminate any adverse effects of backlash and any positional discrepancy between the observer and the apparatus in terms of optical focusing.

SUMMARY OF THE INVENTION

According to an aspect of the present invention, the above objects are achieved by providing an automatic focusing apparatus to be used for an optical system comprising goal generating means for receiving video signals for a subject shot by an optical system and generating in-focus signals out of the received video signals, in-focus state detecting area determining means for determining an in-focus state detecting area within the field taken by the optical system and a CPU for storing in-focus signals transmitted from the in-focus signal generating means and detecting the in-focus position of the subject within the area predetermined by the in-focus state detecting area determining means on the basis of the stored in-focus signals.

According to another aspect of the present invention, the above objects are achieved by providing an automatic focusing apparatus for extracting high frequency components of video signals for a predetermined in-focus area and thereby detecting an in-focus position of a field taken by an optical system, the apparatus comprising a gate for controlling passage of video signals for a subject within the predetermined in-focus area, a signal extracting circuit for allowing passage of high frequency components of the video signals, an in-focus signal detecting circuit for detecting in-focus signals on the basis of the high frequency components of the video signals and a sample-hold circuit for holding the in-focus signals detected by the in-focus signal detecting circuit, wherein the timing of rising of the in-focus signal detecting circuit is set to a time after the timing of rising of the gate and the timing of fall of the in-focus signal detecting circuit is set to a time before the timing of falling of said gate.

According to still another aspect of the present invention, the above objects are achieved by providing an automatic focusing apparatus to be used for an optical system comprising an image pickup means for picking up an image of a subject supported on a support by way of the optical system and transmitting video signals for the subject, pitch setting means for determining an area for in-focus state detection and setting the pitch of movement of focus adjustment to an arbitrarily selected value, extracting means for extracting only the video signals corresponding to the pitch of movement of focus adjustment out of the signals transmitted from the image pickup means, in-focus stale detecting means for detecting the in-focus position of the subject within the area for in-focus detection determined by the pitch setting means and drive means for moving either the support or the optical system for focus adjustment depending on the result of detection of the in-focus state detecting means.

Now, the present invention will be described in greater detail by referring to the accompanying drawings that illustrate a preferred embodiment of the invention.

BRIEF DESCRIPTION OF THE DRAWINGS

FIG. 7 is a graph illustrating the relationship between the input signal and the in-focus signal output voltage of the embodiment of FIG. 1.

FIG. 8 is a view illustrating a waveform representing the relationship among the input signal, the peak-hold output and the integrated output of the embodiment of FIG. 1.

FIG. 9 is a block diagram of the PLL circuit of the embodiment, showing its internal configuration.

DETAILED DESCRIPTION OF THE PREFERRED EMBODIMENT

Figure 1:
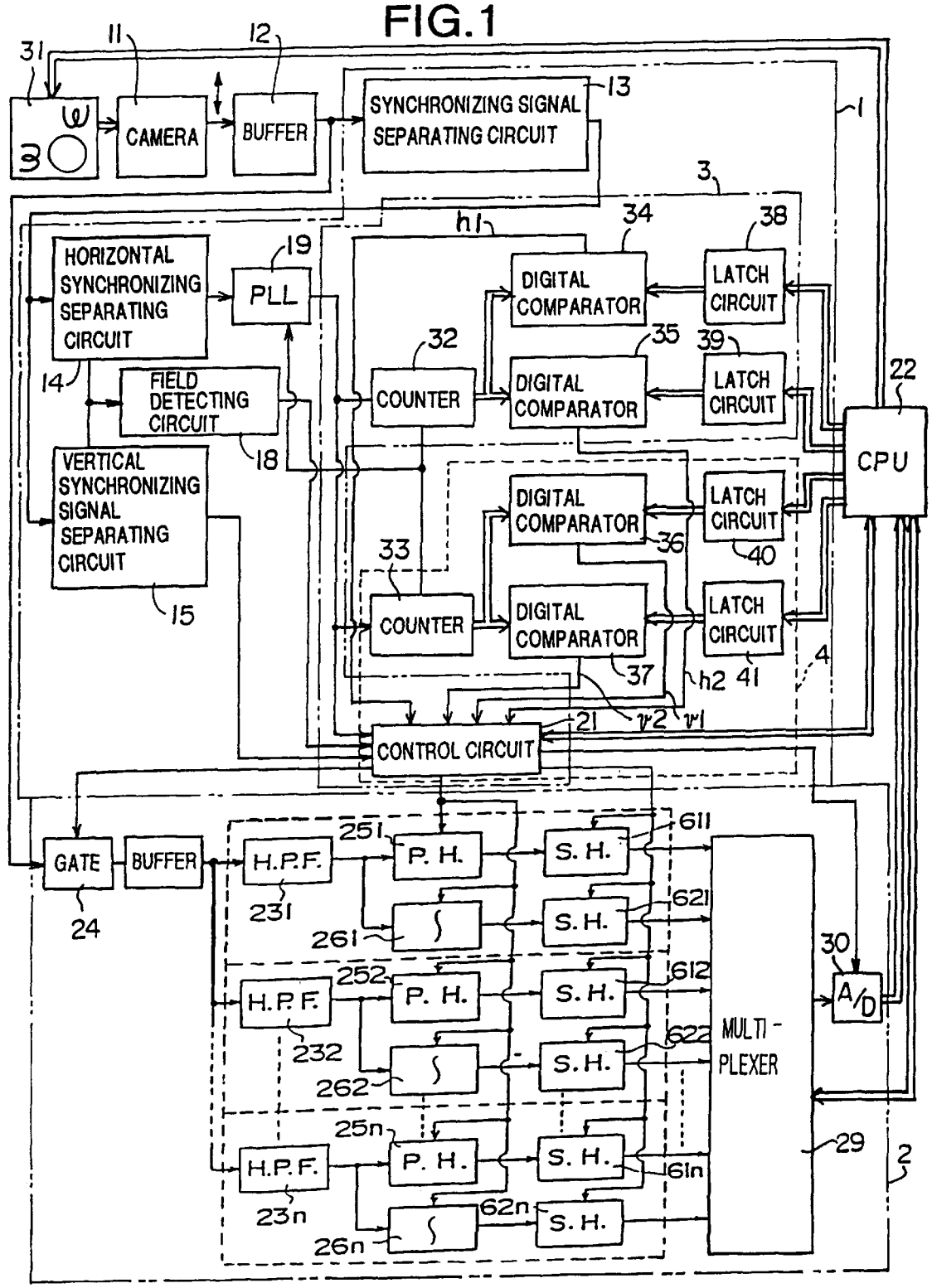
FIG. 1 is a block diagram of a preferred embodiment of the invention.

Referring firstly to FIG. 1 showing a preferred embodiment of the invention, a camera 11 is controlled by a CPU 22 by way of a motor 31. The camera 11 picks up an image of a subject by way of a camera lens and transmits a video signal for the image. The video signal is then supplied by way of a buffer 12 to in-focus state detecting area determining means 1 for determining an in-focus state detecting area in the image carrying frame and in-focus signal out of the video signal.

The in-focus state detecting area determining means 1 comprises a synchronizing signal separating circuit 13 that takes out the synchronizing signal component out of the video signal transmitted from the camera 11 by way of the buffer 12. A horizontal synchronizing signal and a vertical synchronizing signal are extracted from the synchronizing signal component respectively by a horizontal synchronizing signal separating circuit 14 and a vertical synchronizing signal separating circuit 15. Field detecting circuit 18 detects either the first or the second field from the timing of the horizontal and vertical synchronizing signals. The first and second fields alternately appear in the video signals from the camera 11. The horizontal synchronizing signal is then fed by way of a PLL (phase-locked loop circuit 19 to counter 32 of a detecting area determining section 3, counter 33 of a scanning line selecting section 4 and control circuit 21. The vertical synchronizing signal and the output signal of the field detecting circuit 18 are also supplied to the control circuit 21. The control circuit 21 covers both the detecting area selecting section 3 and the scanning line selecting section 4.

As illustrated in FIG. 9, the PLL circuit 19 comprises a phase comparator 191, a low pass filter 192, a voltage control oscillator 193 and a frequency divider 194, which are arranged to form a loop. The voltage control oscillator 193 generates a signal that oscillates with a frequency equal to that of the horizontal synchronizing signal extracted by the horizontal synchronizing signal separating circuit 14 multiplied by n (e.g., 256). The generated signals is the output signal of the PLL circuit 19, which is applied to the detecting area selecting section 3 and the scanning line selecting section 4 as reference signal. The frequency of the output signal of the voltage control oscillator 193 is divided by n by the frequency divider 194 to become substantially equal to that of the horizontal synchronizing signal and the frequency divider 194 transmits its output as a horizontal synchronizing signal, which is then sent to the phase comparator 191, which in turn compares the phase of the horizontal synchronizing signal with that of the signal transmitted from the frequency divider 194 to detect any difference between them. The output frequency of the voltage control oscillator 193 is so controlled as to eliminate any difference between those phases. Consequently, the reference pulse, or the output signal of the PLL circuit 19, shows a phase that agrees with that of the horizontal synchronizing signal.

In FIG. 1, the detecting area selecting section 3 comprises a counter 32, a pair of digital comparators 34, 35 and a pair of latch circuits 38, 39. The counter 32 starts counting the number of signals having a frequency equal to that of the horizontal synchronizing signal coming from the PLL circuit 19 multiplied by n when the horizontal synchronizing signal is entered there and stops counting when the next horizontal synchronizing signal is entered or when the reading has reached a predetermined value that corresponds to an entire horizontal scanning line. At this moment, the counter is reset to start counting again. The count value of the counter 32 is compared by the digital comparator 34 with a horizontal position selecting signal given by the CUP 22 and latched by the latch circuit 38 and, if they agree with each other, a horizontal position signal $h_1$ is sent out. In a similar manner, the count value of the counter 32 is compared by the digital comparator 35 with a horizontal position selecting signal given by the CUP 22 and latched by the latch circuit 39 and, if they agree with each other, a horizontal position signal h2 is sent out. The horizontal position signals $h_1$ and h2 are used to horizontally limit the area where in-focus signals are obtained and therefore given to the control circuit 21.

Similarly, scanning line selecting section 4 comprises a counter 33, a pair of digital comparators 36, 37 and a pair of latch circuits 40, 41. The counter 33 counts the number of horizontal synchronizing signals coming from the PLL circuit 19 and terminates its counting when the reading has reached a predetermined value that corresponds to an entire horizontal scanning line. At this moment, the counter is reset to start counting again. The count value of the counter 33 is compared by the digital comparator 36 with a scanning line selecting signal given by the CUP 22 and latched by the latch circuit 40 and, if they agree with each other, a scanning line signal vi is sent out. In a similar manner, the count value of the counter 33 is compared by the digital comparator 37 with a scanning line selecting signal given by the CUP 22 and latched by the latch circuit 41 and, if they agree with each other, a scanning line signal v2 is sent out. The scanning line signals $v_1$ and v2 are used to vertically limit the area where in-focus signals are obtained and therefore given to the control circuit 21.

When the area of the scanning lines defined by the horizontal position signals $h_1$, h2 and the scanning line signals $v_1$, v2 sent respectively from the detecting area selecting section 3 and the scanning line selecting section 4 is scanned, the control circuit 21 opens the gate 24 to take said video signal into the in-focus signal generating means 2. The in-focus signal generating means 2 comprises a detection circuit constituted by a HPF 231 for passing the high frequency component of the video signal it has taken in, a peak-hold circuit 251 for holding the peak value of the high frequency components, a sample-hold circuit 611 for taking up said peak value with a predetermined timing, an integrating circuit 261 for integrating the high frequency component and a sample-hold circuit 621 for taking up the integrated value with a predetermined timing. The in-focus signal generating means 2 comprises another detection circuit constituted by a HPF 232, a peak-hold circuit 252, a sample-hold circuit 612, an integrating circuit 262 and a sample-hold circuit 622. In this way, the in-focus signal generating means 2 comprises a total of n detection circuits having a similar configuration. In FIG. 1, the n-th detection circuit is constituted by a HPF 23n, a peak-hold circuit 25n, a sample-hold circuit 61n, an integrating circuit 26n and a sample-hold circuit 62n. The timing of operation of the peak-hold circuit, the sample-hold circuits and the integrating circuit of each detection circuit is controlled by the control circuit 21. The lower cut-off frequencies of the respective HPFs 231, 232, . . . , 23n of the detection circuits are differentiated step wise so that they transmit respective in-focus detection signals that correspond to the contrast values of the video signal. The HPFs form a signal extraction circuit that allows the high frequency component of the video signal to pass therethrough. The peak-hold circuits 251 through 25n and the integrating circuits 261 through 26n form an in-focus signal detection circuit.

The in-focus signal generating means 2 also comprises a multiplexer 29 for selecting one of the outputs of the sample-hold circuits 611, 612, . . . , 61n or one of the outputs of the sample-hold circuits 621, 622, . . . , 62n of the detection circuits as well as an analog/digital conversion circuit 30 for converting the output of the multiplexer 29, which is an analog signal, into a digital signal. The digital signal sent out from the analog/digital conversion circuit 30 is given to the CPU 22.

Figure 2:
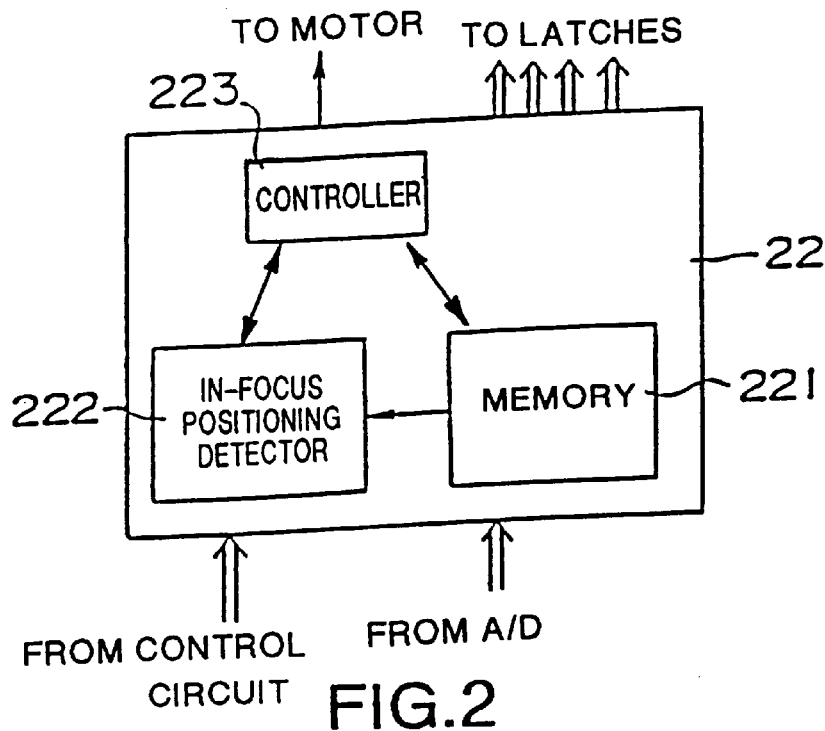
FIG. 2 is a block diagram of the CPU of the embodiment of FIG. 1, showing its internal configuration.

Referring to FIG. 2, the CPU 22 comprises a memory 221 for storing digitized in-focus detection signals transmitted from the analog/digital conversion circuit 30, an in-focus position detecting section 222 for detecting the in-focus position from the in-focus signals stored in the memory 221 and a control section 223 for controlling the memory 221 and the in-focus position detecting section 222. The CPU 22 selects one of the output(s) of the one or more than one sample-hold circuits for each scanning line by means of said multiplexer 29 and takes it in by way of the analog/digital conversion circuit 30 to store it in the memory 221. Then, the CPU 22 processes the in-focus signals for each scanning line in the memory 221 to produce a set of in-focus signals for each frame, which are then utilized to control the motor 31.

Figure 11:
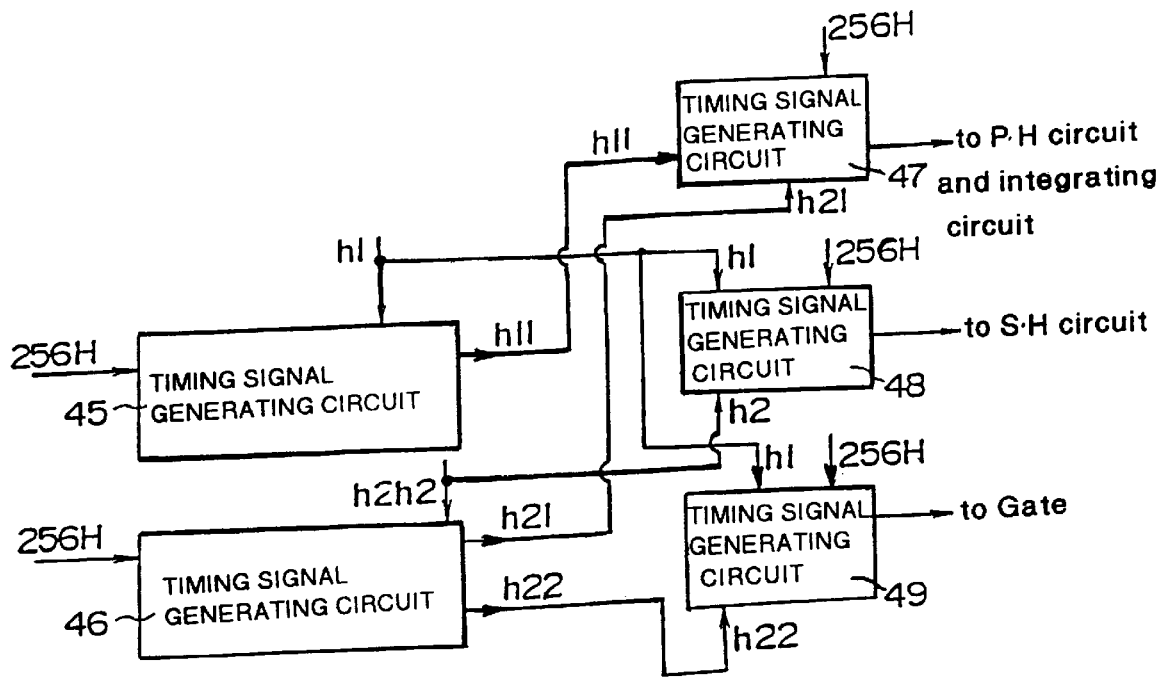
FIG. 11 is a block diagram of the timing control circuit in the control circuit of the embodiment of FIG. 1.

As described above, the timing of operation of the gate 24, the peak-hold circuits 251 through 25n, the sample-hold circuits 611 through 62n, the integrating circuits 261 through 26n is controlled by the control circuit 21, which comprises a timing control circuit as illustrated in FIG. 11. Referring to FIG. 11, reference numerals 45, 46, 47, 48 and 49 denote respective timing signal generating circuits, to which a signal having a frequency equal to that of the horizontal synchronizing signal H multiplied by n (e.g., 256) is applied from the PLL circuit 19. The timing signal generating circuit 45 generates a signal ha after a predetermined period of time from the reception of the horizontal position signal hi. The timing signal generating circuit 46 generates a signal h21 after a predetermined period of time from the reception of the horizontal position signal h2 and then another signal h22 after a predetermined period of time from the generation of the signal h21. The timing signal generating circuit 47 generates a signal that rises with the signal ha and falls with the signal 21 and transmits it to the peak-hold circuits 251 through 25n and the integrating circuits 261 through 26n. The timing signal generating circuit 48 generates a signal that rises with the signal hi and falls with the signal h2 and transmits it to the sample-hold circuits 611 through 62n. The timing signal generating circuit 49 generates a signal that rises with the signal hi and falls with the signal h22 and transmits it to the gate 24.

Figure 12:
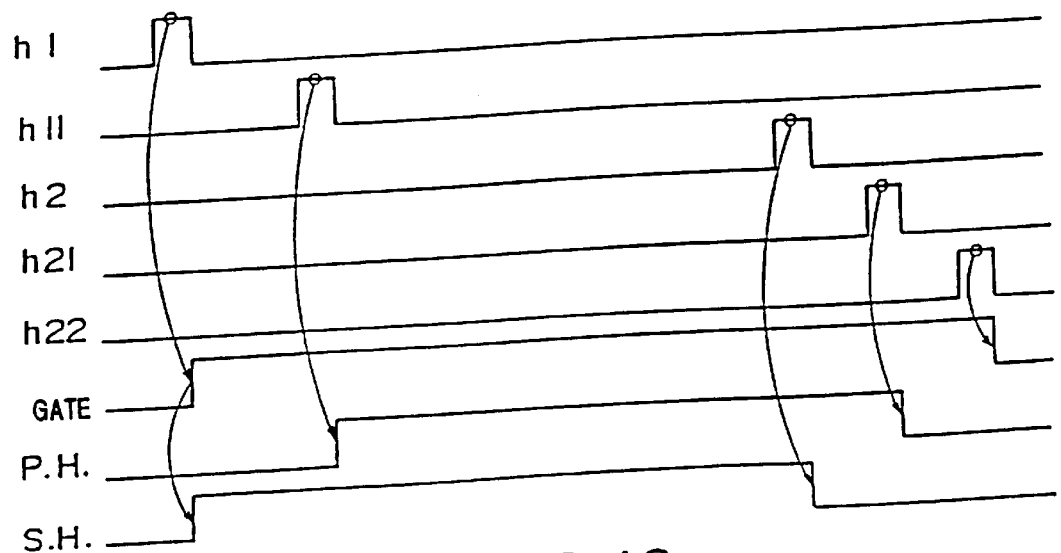
FIG. 12 is a timing chart illustrating the operation of the timing control circuit of FIG. 11.

The timing of operation of each of the above signals is shown in FIG. 12. The rising edge of the signals of the peak-hold circuits 251 through 26n and the integrating circuits 261 through 26n comes after that of the signal of the gate 24 and the falling edge of the signals of the peak-hold circuits 251 through 25n and the integrating circuits 261 through 26n comes before that of the signal of the gate 24. The falling edge of the signals of the sample-hold circuits 611 through 62n comes before that of the signals of the peak-hold circuits 251 through 25n and the integrating circuits 261 through 26n.

Figure 13:
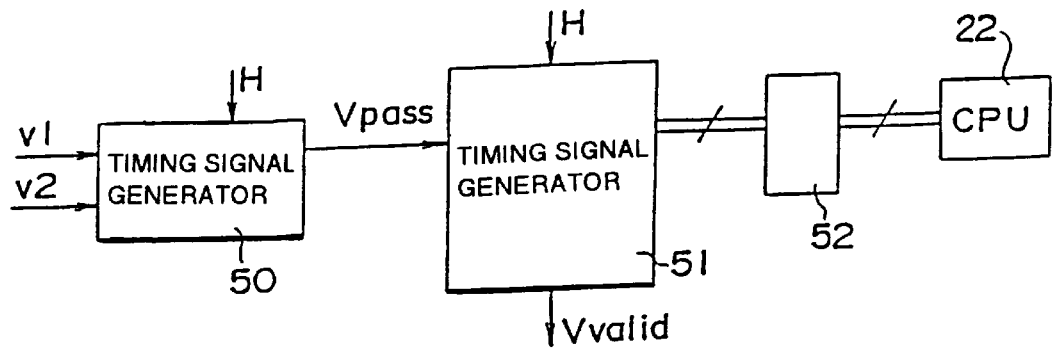
FIG. 13 is a block diagram illustrating an example of the scanning line specifying circuit in the control circuit of the embodiment of FIG. 1.
Figure 14:
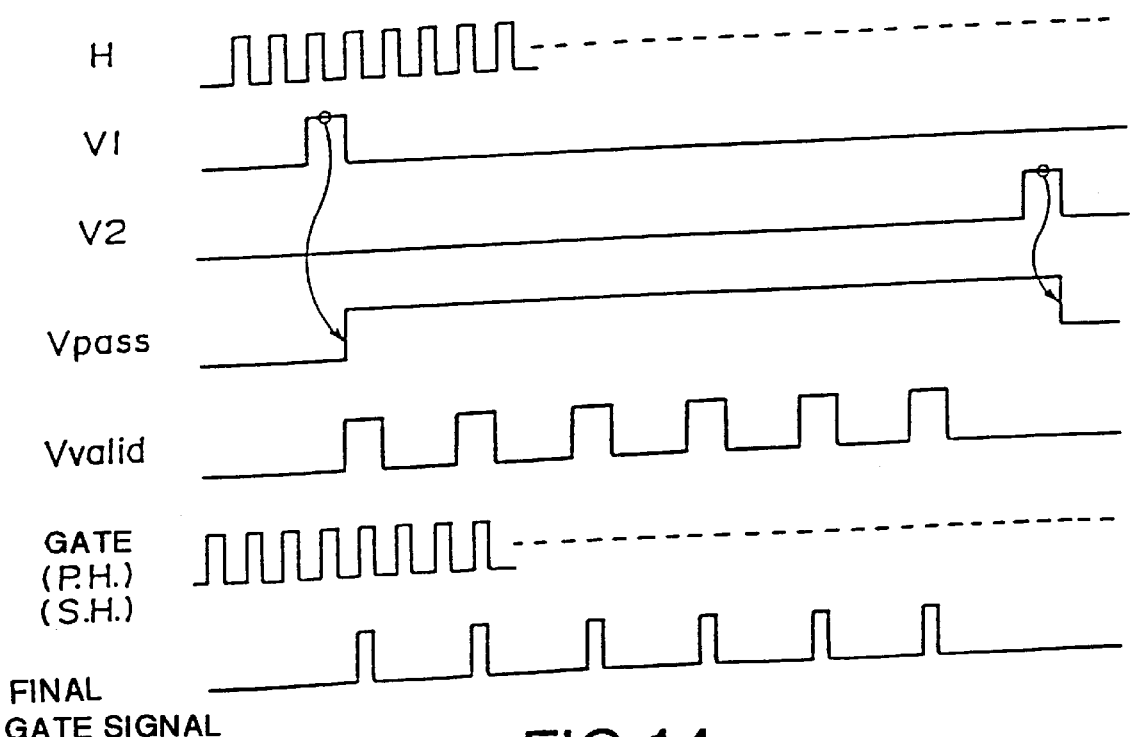
FIG. 14 is a timing chart illustrating the operation of the scanning line specifying circuit of FIG. 13.
Figure 15:
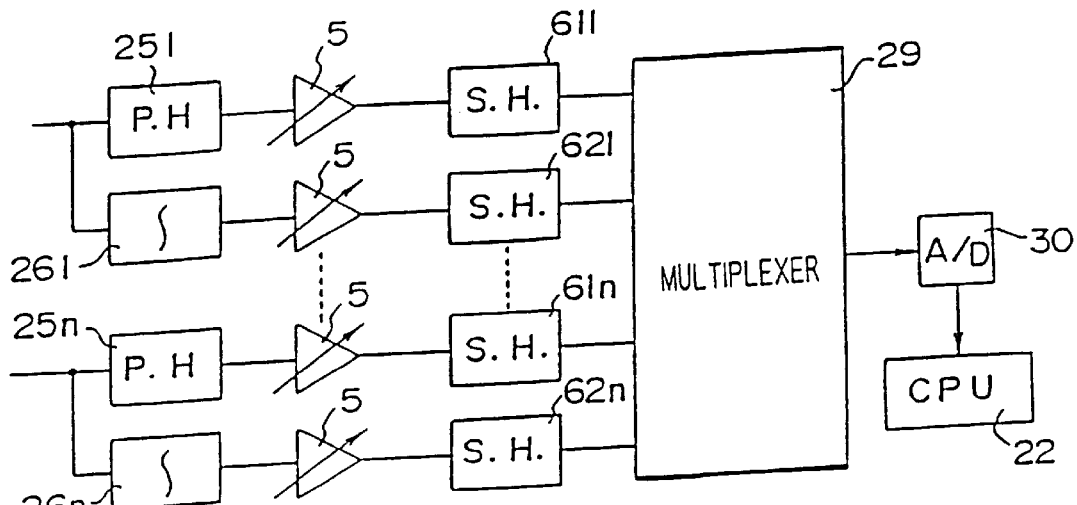
FIG. 15 is a block diagram of in-focus signal generating means obtained by modifying that of the embodiment of FIG. 1.

FIG. 13 shows a block diagram illustrating an example of the scanning line specifying circuit in the control circuit of the embodiment of FIG. 1. Referring to FIG. 13, timing signal generating circuit 50 transmits a signal Vpass that rises with the scanning line signal vi and falls with the scanning line signal v2. The signal Vpass is a scanning line output within the in-focus area. Timing signal generating circuit 51 transmits an effective scanning line output Vvalid, which is used for an in-focus signal that appears within the effective period of the signal Vpass and given to the gate (and the peak-hold circuits and the sample-hold circuits). While, the gate is normally supposed to receive a signal having a frequency equal with that of the horizontal synchronizing signal H, the effective scanning line output Vvalid is given to the gate here as a final gate signal. Therefore, not all the scanning lines but only a limited number of scanning lines obtained by thinning out at an appropriate rate are taken for in-focus signal detection. FIG. 14 shows a timing chart illustrating the operation of the scanning line specifying circuit of FIG. 13. The time required for processing can be reduced by thinning out the scanning lines so that the apparatus may accommodate any situation where the operation of processing contrast signals is so complicated that only a short period of time is left for A/D conversion and CPU processing.

The above described embodiment operates in the following manner. The embodiment takes up a video signal given to it by way of the buffer 12 in FIG. 1 only when the gate is open (between the signals hi and h22). In other words, the portion of the video signal that corresponds to the area to be detected for an in-focus signal is taken into the in-focus signal generating means 2 and the HPFs 231 through 23n extract the high frequency components of the signal. The peak values of the extracted high frequency components are sequentially detected by the respective peak-hold circuits 251 through 25n while they are operating (between the signals ha and h21) and held by the sample-hold circuits with predetermined timings. In other words, the peak values obtained by the peak-hold circuits 251 through 25n between the signals hi and h2 are given to the respective sample-hold circuits 611 through 61n with predetermined timings, although, once the rising signal (signal h2) is entered, the sample-hold circuits 611 through 61n hold the peak values obtained when the signal h2 is entered. The high frequency components are integrated by the respective integrating circuits 261 through 26n and the integrated values are held by the respective sample-hold circuits 621 through 62n with predetermined timings.

Figure 4:
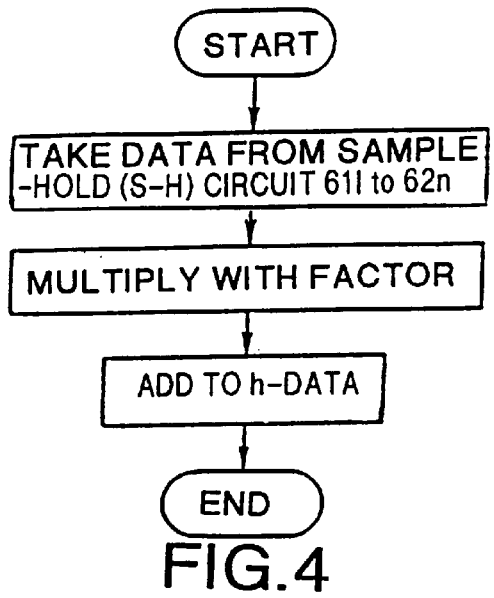
FIG. 4 is a flow chart illustrating how in-focus signals are added for each scanning line.
Figure 5:
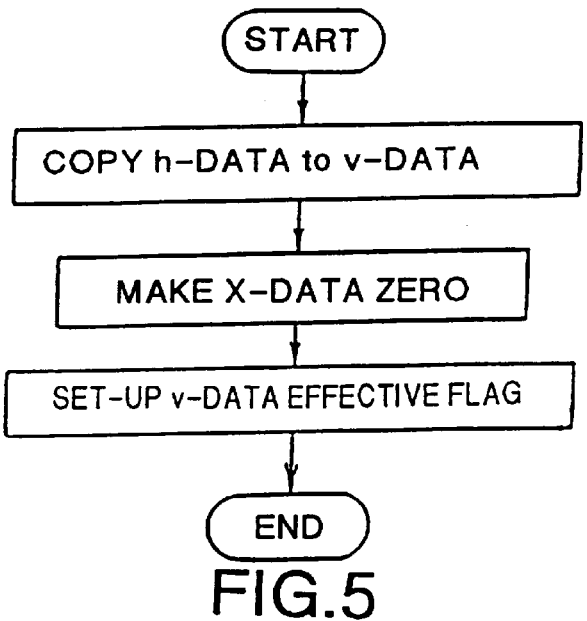
FIG. 5 is a flow chart illustrating how in-focus signals are fed to the CPU for each frame.
Figure 6:
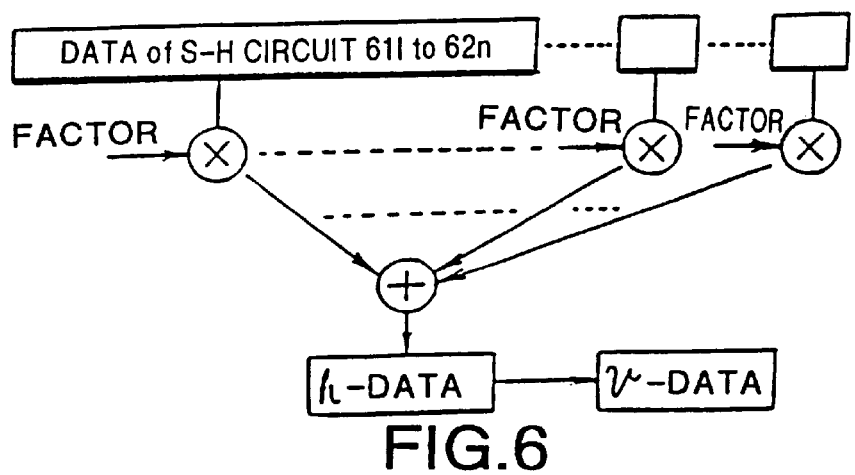
FIG. 6 is a schematic view illustrating how the operation of adding signals for each scanning line and that of feeding in-focus signals to the CPU are correlated.

Under the control of the CPU 22, the multiplexer 29 selects one or more than one of the outputs of the sample-hold circuits 611 through 61n or the sample-hold circuits 621 through 62n and stores them in the memory 221 of the CPU 22. The data stored in the memory 221 correspond to the contrast of the image of the subject and, therefore, processed in the CPU 22 as in-focus signals. FIGS. 4 and 5 illustrate how the CPU 22 operates for data processing. In the processing as illustrated in FIG. 4, the CPU 22 takes up one output or more than one output of the sample-hold circuits 611 through 61n and 621 through 62n. Since the HPF 231 through 23n show different output voltage-lens distance relationships, the CPU 22 multiplies the selected ones of the outputs of the sample-hold circuits 611 through 61n and 621 through 62n by respective appropriate factors and then adds the products to obtain a desired output voltage-distance relationship. The operation of multiplication may be realized by arranging a variable gain amplifier between each of the peak-hold circuits 251 through 26n and the corresponding sample-hold circuits 611 through 62n or, alternatively, by storing the factors in the CPU 22. The added data are then further added to the h-data to complete the processing for each scanning line. Then, in the processing for each frame as illustrated in FIG. 5, after copying the h-data to the v-data, the CPU 22 reduces the h-data to zero and sets up a v-data effective flag to complete the processing. FIG. 6 illustrates how data flow in the CPU 22 for the above processing operations. The CPU 22 accumulates data for a frame by adding data for each scanning line and stores them in the memory 221 as h-data. It also stores the data for a frame in the memory 221 as v-data.

Figure 3:
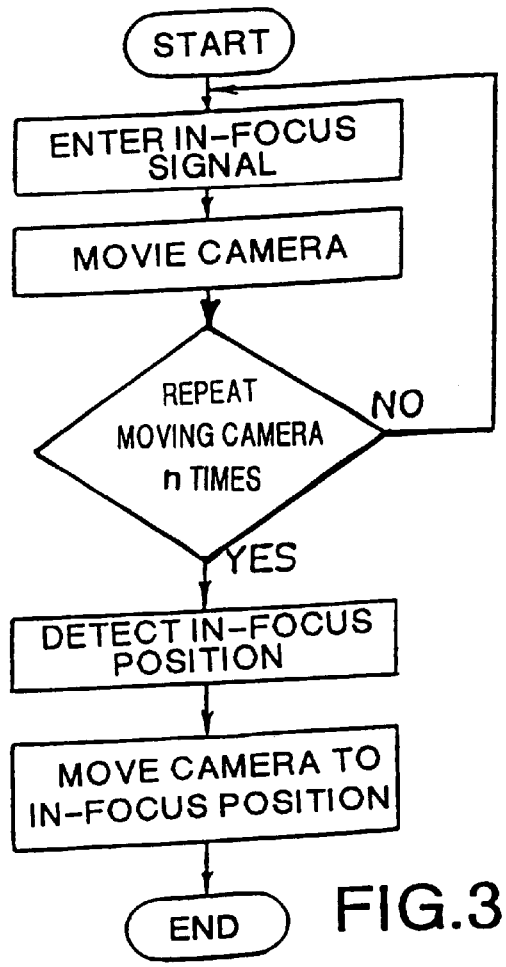
FIG. 3 is a flow chart illustrating how the embodiment of FIG. 1 operates for automatic focusing.

For automatic focusing, the apparatus searches a v-data effective flag while driving the distance adjuster ring of the camera 11 by means of the motor 31 and, whenever a v-data effective flag is found, it copies the data to the data table to locate the peak. FIG. 7 illustrate the relationship between the lens position and the output voltage of the v-data. Since the peak of the. output voltage indicate the in-focus position, the distance adjuster ring needs to be stopped when the peak is located. As described earlier by referring to FIG. 1, since an in-focus signal is produced by adding the high frequency components of a video signal obtained by means of a plurality of HPFs with different cut-off frequencies, the graph of the output voltage-lens distance relationship will show a sharp peak and gentle slopes. Thus, it can be easily recognized in which direction the lens is being moved during the automatic focusing operation and consequently the time required for automatic focusing can be significantly reduced. Accordingly, the operation of automatic focusing can be performed accurately. FIG. 3 shows a flow chart illustrating how the operation of automatic focusing is carried out. The camera or its distance adjuster ring is moved stepwise while in-focus signals are given to the embodiment and the peak of the output voltage is located as described above to determine the in-focus position. The operation of automatic focusing is completed when the camera or its distance adjuster ring is moved to the determined in-focus position.

In the embodiment of FIG. 1, there are provided a total of n integrating circuits 261 through 26n arranged in parallel with the peak-hold circuits 251 through 25n. When the video signal of the subject carries a poor contrast, the high frequency components of the video signal obtained by way of the HPFs 231 through 23n are integrated for each scanning line by means of the integrating circuit 261 through 26n and the integrated values are taken out by the respective sample-hold circuits with predetermined appropriate timings and supplied to the CPU 22 for processing as so many in-focus signals. If the output of the HPF 231 and therefore the input of the peak-hold circuit 251 and the integrating circuit 261 has a waveform as indicated by (a) of FIG. 8, then the output of the peak-hold circuit 251 will be the difference between the maximum value of the positive side and that of the negative side of the input signal as indicated by (b) of FIG. 8. This represents a value that corresponds to the portion of the scanning line under examination that carries the strongest contrast. On the other hand, the output of the integrating circuit 26a is incremented as the components of the input signal are accumulated, as indicated by (c) of FIG. 8, to produce an output that corresponds to the overall contract of the scanning line. The above statement holds true for each of the integrating circuits 232 through 23n. Consequently, when the video signal shows a weak contrast and the output of the peak-hold circuits are small, accurate focusing can be achieved by obtaining in-focus signals from the integrating circuits. Alternatively, the peak values and the integrated values may be added to form in-focus signals. If such is the case, the same set of weighting factors may be used for both the peak values and the integrated values or, alternatively, either of the values may be more heavily weighted.

Figure 16:
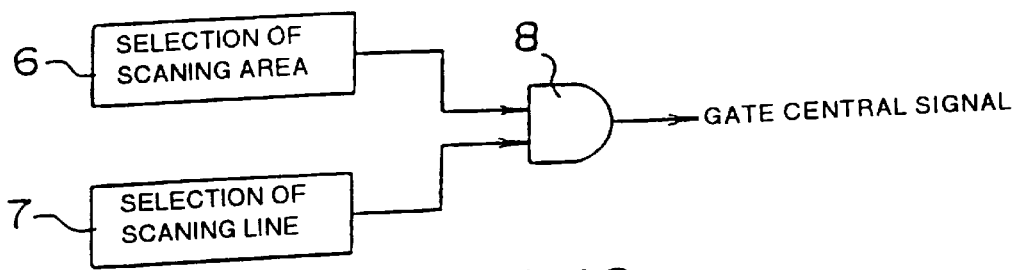
FIG. 16 is a block diagram schematically illustrating the gate control signal generating section of the control circuit of the embodiment of FIG. 1.

The gate 24 that allows video signals to proceed to the in-focus signal generating means 2 is controlled by the control circuit 21, which by turn controls the gate to allow passage of video signals only for the in-focus detection area defined by the detecting area selecting section 3 and the scanning line selecting section 4. FIG. 16 schematically illustrates the operation of controlling the gate by the control circuit 21 of the embodiment of FIG. 1. Assuming that 6 denotes selection of scanning area and 7 denotes selection of scanning line, 6 and 7 are combined by an AND-circuit 8 to produce a gate control signal, which is given to the gate 24.

Figure 17:
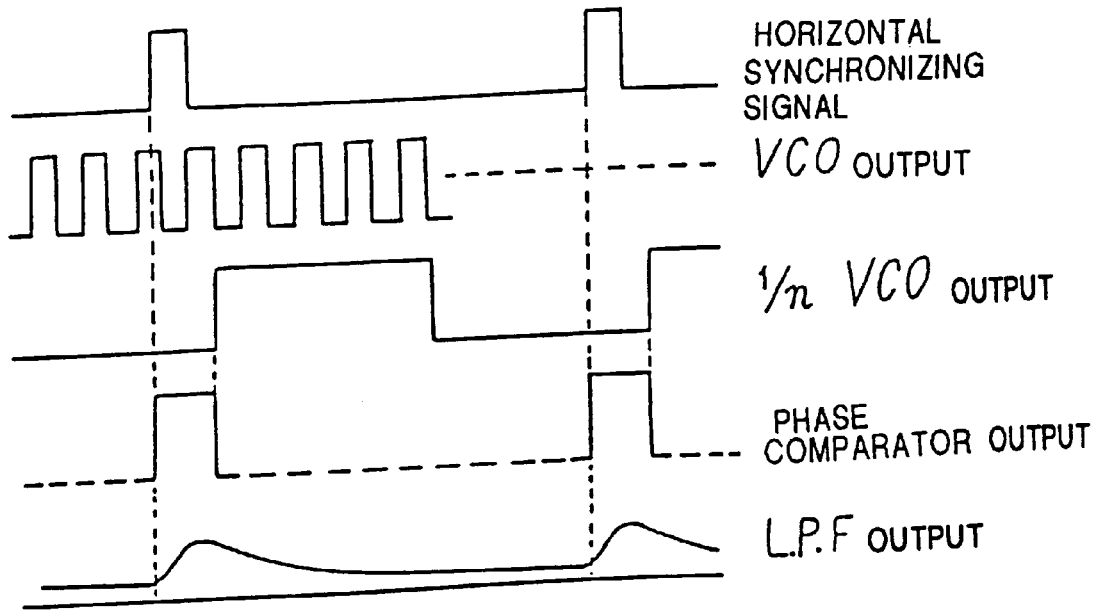
FIG. 17 is a timing chart illustrating an operation of the PLL circuit of the embodiment of FIG. 1.
Figure 18:
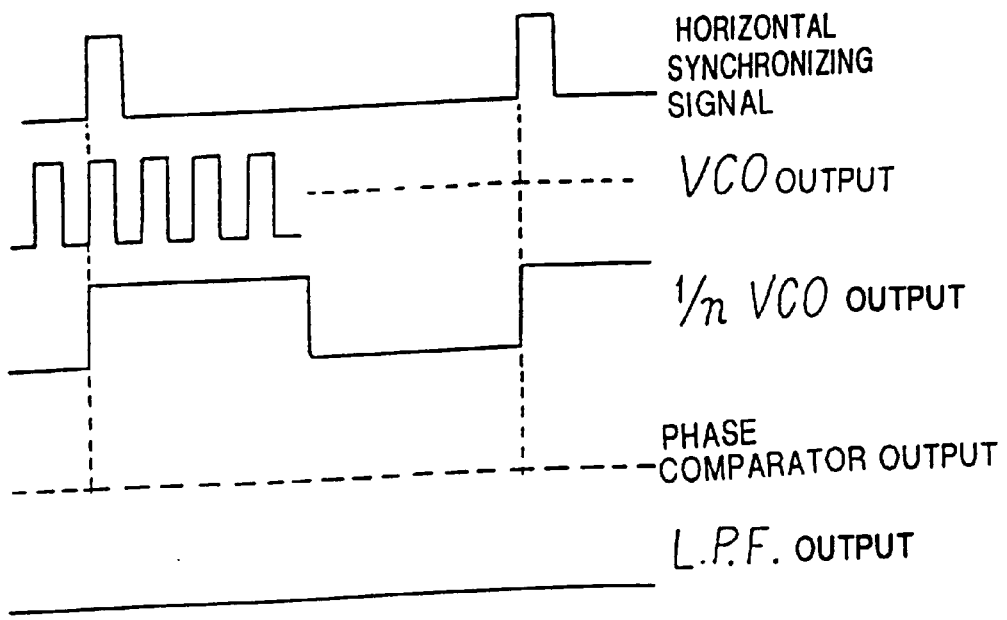
FIG. 18 is a timing chart illustrating a different operation of the PLL circuit of the embodiment of FIG. 1.

As described earlier by referring to FIG. 1, a horizontal synchronizing signal extracted by the horizontal synchronizing signal separating circuit 14 from the synchronizing signal component of a video signal is sent to the counters 32, 33 and the control circuit 21 by way of the PLL circuit 19. If there is no PLL circuit 19, the reference clock of the control signal and the horizontal synchronizing signal are not correlated and the selected scanning area can be shifted by one pulse, resides, the fact that the horizontal synchronizing signal has a frequency that may slightly differ from camera to camera can also shift the selected scanning area. On the other hand, the use of a PLL circuit 19 ensures agreement of the phase of the reference clock and that of the horizontal synchrony,ins signal and eliminates any possible shift of scanning area. FIGS. 17 and 18 show timing charts illustrating two different operations of the PLL circuit of the embodiment of FIG. 1. As shown in FIG. 17, if the phase of the horizontal synchronizing signal is shifted relative to that of the output signal. Therefore, if it is also shifted relative to the phase of the 1/nVCO output of the frequency divider 194 (See FIG. 9), the phase comparator 191 transmits a signal representing the difference of the phase of the synchronizing signal and that of the 1/nVCO output. A signal for a level corresponding to this signal is transmitted from the low pass filter 192 and the output of the voltage control oscillator 193 is controlled on the basis of this signal so that agreement of the phase of the horizontal synchronizing signal and that of the 1/nVCO output is maintained as illustrated in FIG. 18. A signal obtained by multiplying the horizontal synchronizing signal by n transmitted from the voltage control oscillator 193 is given to the counters 32, 33 and the control circuit 21 as a reference clock signal. Since the phase of the reference clock and that of the horizontal synchronizing signal are made to completely agree with each other, there occurs no shift of scanning area.

The gate 24 that allows video signals to proceed to the in-focus signal generating means 2 is controlled by the control circuit 21, which in turn controls the gate to allow passage of video signals only for the in-focus detection area defined by the detecting area selecting section 3 and the scanning line selecting section 4. FIG. 16 schematically illustrates the operation of controlling the gate by the control circuit 21 of the embodiment of FIG. 1. Assuming that 6 denotes selection of scanning area and 7 denotes selection of scanning line, 6 and 7 are combined by an AND-circuit 8 to produce a gate control signal, which is supplied to the gate 24.

As described earlier and shown in FIG. 10, transient noise Tn can appear on the video output signal at the rising and falling timings of the gate 24. However, since the rising timing of the peak-hold circuits 251 through 25n and the integrating circuits 261 through 26n is delayed by a predetermined time a from the rising timing of the gate 24 and the falling timing of the peak-hold circuits 251 through 25n and the integrating circuits 261 through 26n is delayed by a predetermined time from the falling timing of the gate 24, the falling and rising edges of the video output signal that carries transient noise Tn are cut off respectively by amounts corresponding to the times a and b to remove the transient noise Tn so that a video output signal which is free from transient noise is used for detection of in-focus signals. Consequently, the embodiment can utilize in-focus signals that are not affected by transient noise and perform the operation of automatic focusing very accurately.

Figure 10:
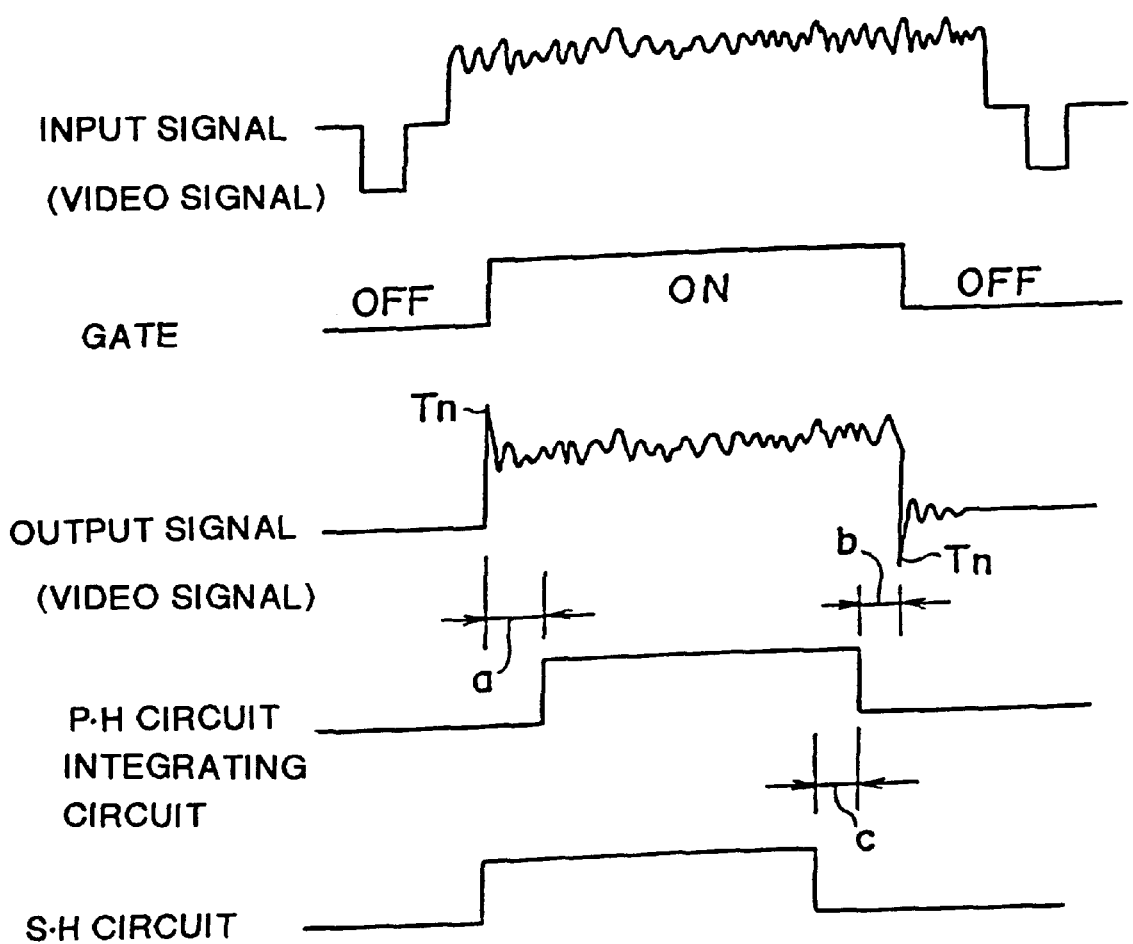
FIG. 10 is a timing chart illustrating the operation of the in-focus signal detecting section of the embodiment of FIG. 1.

As illustrated in FIG. 10, the falling timing of the sample-hold circuits 611 through 62n precedes the falling timing of the peak-hold circuits 251 through 25n and the integrating circuits 261 through 26n by a predetermined time c in consideration of the delay of operation of the sample-hold circuits 251 through 25n so that a sufficient hold time may be secured.

It should be noted that the multiplexer 29 as shown in FIG. 1 may be arranged upstream relative to the sample-hold circuits 611 through 61n. While a single sample-hold circuits may be used in place of a plurality of sample-hold circuits, no plural data can be processed if a single sample-hold circuit is employed. Each of the sample-hold circuits 611 through 61n may be provided with an analog/digital conversion circuit. A PLL circuit may be applied to a dot clock generator for analog/digital conversion in an image processing apparatus in a manner as a PLL circuit is used for the purpose of the present invention. While the counter 32 is independent from the PLL circuit lug in the illustrated embodiment, it may be replaced by the frequency divider 194 located in the PLL circuit 19.

The extraction circuit for passing the high frequency component of the video signal may be replaced by a band pass filter (BPF).

Figure 19:
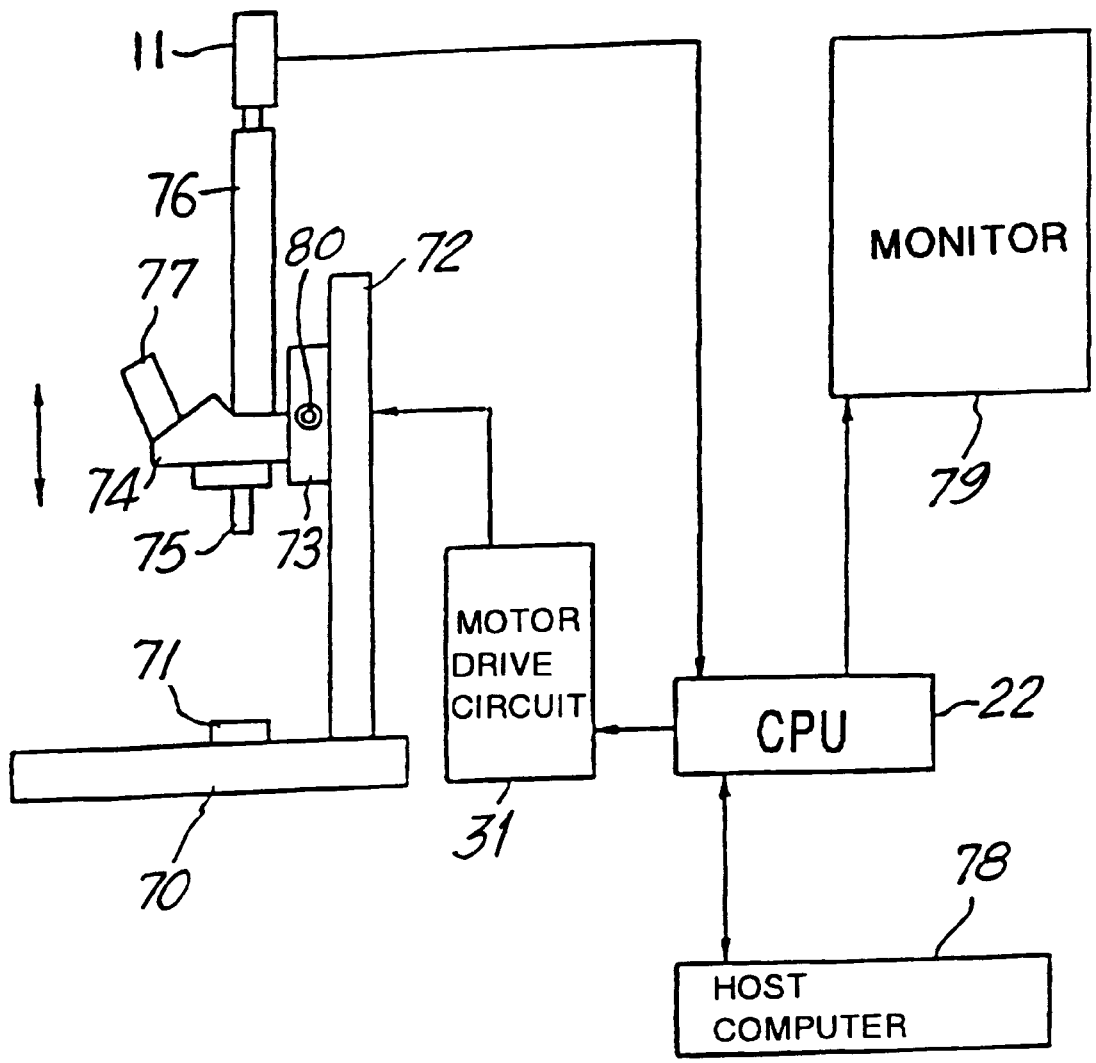
FIG. 19 is a block diagram of an apparatus realized by incorporating an automatic focusing apparatus according to the invention for performing focusing operation of an optical system.

FIG. 19 is a block diagram of an apparatus realized by incorporating an automatic focusing apparatus according to the invention for performing focusing operation of an optical system. Work 71 is placed on the base 70 of the apparatus and the support 72 of an optical system is secured to the base 70. A stationary table 73 is securely fitted to the support of the optical system 72 and a movable table 74 is fitted to the stationary table 73 so that it may be movable along the z-axis of the system. The optical system 76, or a microscope comprising an objective lens 75, and an image pickup device 11 which is a camera are integrally set up on the movable table and rigidly secured thereto so that the work 71 can be observed from an observation section 77 of the optical system arranged on the base 70 by way of the objective lens 75. The camera 11 picks up an image of the work 71 placed on the base 70 by way of the objective lens 75 (and therefore the optical system 76) and produces a video signal representing the image. A stepping motor 80 is arranged on the stationary table 73 so that it can drive the optical system 76 to move along the optical axis (z-axis) for focusing. More specifically, it is controlled by a motor drive circuit 31 to drive the optical system 76 and the camera 11 which is an image pickup device 11 along the z-axis. As described later, a focal point adjuster section 22 is arranged to detect the in-focus position of the work 71 from the video signal transmitted from the camera 11 in accordance to the signal supplied to it from a host computer 78 and transmits an output signal representing the in-focus position to the motor drive circuit 31, which drives the stepping motor 80 to move the optical system and the camera 11 along the z-axis in accordance with the output signal of the focal point adjuster section 22. A monitor CRT 79 receives the video signal from the camera 11 by way of the focal point adjuster section 22 to display the image of the work 71.

Referring to FIG. 19, the position of the camera 11 is controlled by the CPU 22 by way of the motor 31. The camera 11 takes an image of the subject by way of its cup lens and transmits a video signal representing the image. The video signal is then given to the in-focus state detecting area determining means 1 for selecting an in-focus state detecting area and the in-focus signal generating means 2 for generating in-focus signals out of video signals it receives.

Figure 20:
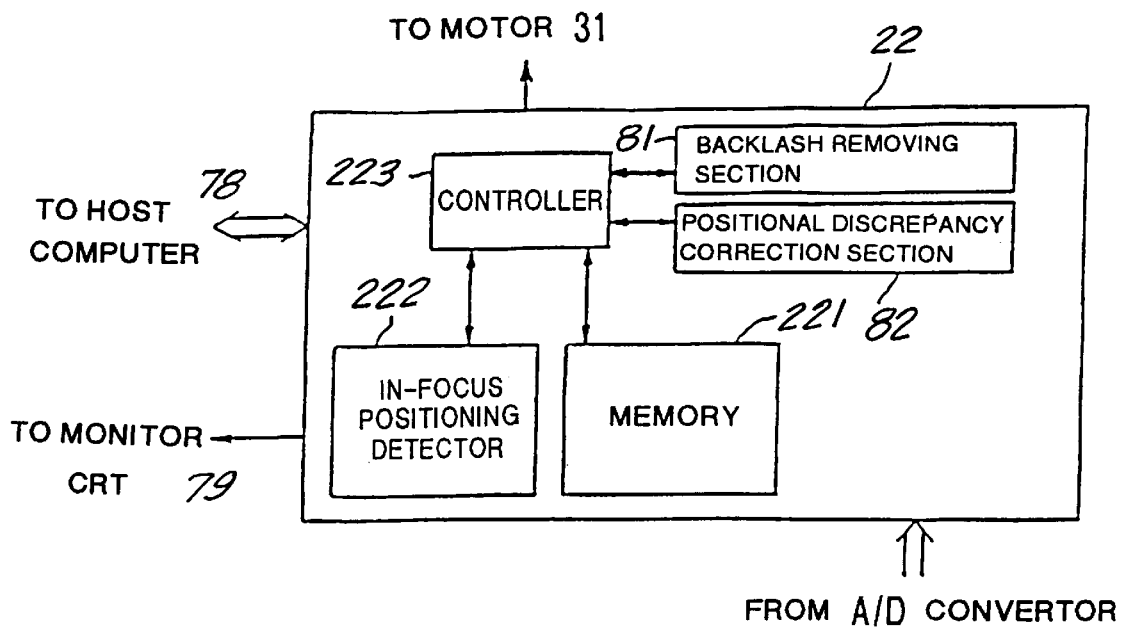
FIG. 20 is a block diagram of the in-focus state detecting section of the apparatus of FIG. 19.

FIG. 20 is a block diagram of the focal point adjustor section of the apparatus of FIG. 19.

As described above, the focal point adjustor section 22 is in fact a microcomputer and comprises a control section 223, a memory 221, an in-focus position detecting section 222, an backlash removing section 81 and a positional discrepancy correcting section 82. Each time an A/D converter 30 transmits a video signal to the focal point adjustor section 22, it is written into the memory 221 and the video signal written into the memory 221 is modified so that the movable table 76 may be moved by the backlash removing section 81 by an amount that corresponds to the backlash. In a similar manner, the movable table 74 is also moved by an amount that corresponds to the value of positional discrepancy specified by the positional discrepancy correcting section. The value of positional discrepancy is determined by considering the positional discrepancy of the in-focus position of the focal point adjustor section 22 and that of the observer. The in-focus position detection section 222 detects the in-focus position of the work from the video signal which is free from the influence of backlash and positional discrepancy. The relationship of the result (output signal) of the operation of the in-focus position detecting section 222 and the position of the optical system 76 is illustrated in FIG. 7. The output signal of the in-focus position detecting section 222 shows a maximum level when the position of the optical system 76 agrees with the in-focus position and decreases as the optical system 76 moves away from the in-focus position.

The CPU 22 of the above described apparatus operates in the following manner.

Figure 22:
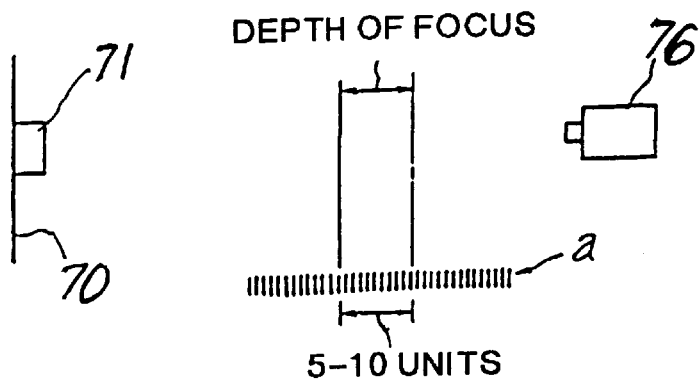
FIG. 22 is a schematic view illustrating the function of parameters J and S of the apparatus of FIG. 19.

The CPU 22 utilizes two parameters J and S for controlling the movement of the movable table 74. J is used to determine the pitch with which the movable table 74 is positionally shifted for adjustment of focal point. When the work 71 is shot by the optical system, the movable table 74 is held somewhere along scale a as shown in FIG. 22. The parameter J determines the pitch of the scale a. If the movable table 74 is designed so as to move by 0.2 μm each time a pulse is given to drive the stepping motor 80, the value of the parameter J is set to 5, which is stored in the memory 221 to move the movable table 74 with a pitch of 1 μm by means of the stepping motor 80 for adjustment of focal point. Thus, the focal point adjuster section 22 takes in a video signal each time five pulses are sent to the stepping motor 80. The pitch of movement of the movable table 74 is termed a unit. Therefore, five pulses constitute a unit when J=5.

Figure 21:
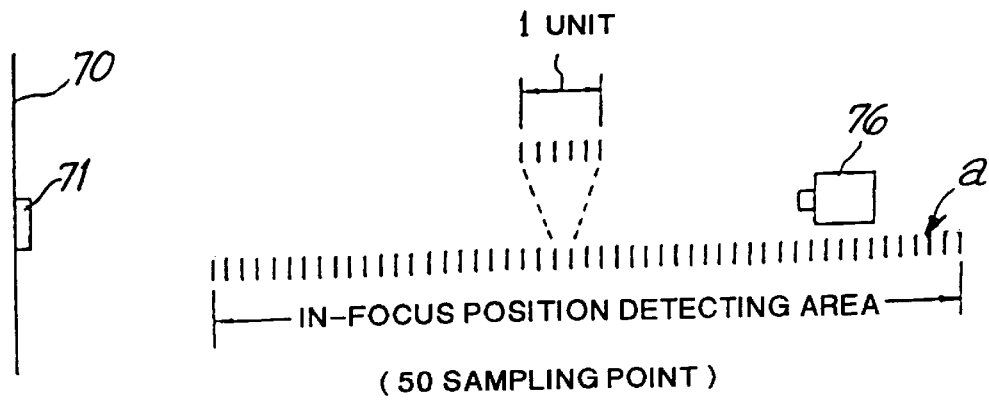
FIG. 21 is a schematic view illustrating the function of parameter J of the apparatus of FIG. 19.

The parameter S is a parameter used to determine the extent of detection of the in-focus position. If the host computer 78 specifies S=50 and stores it in the memory 221 as illustrated in FIG. 21, the operation of detection of the in-focus position is carried out within an extent of 50 sampling points from the origin.

The accuracy of focal point adjustment depends on the depth of focus of the optical system 76 and the resolution of the movable table 74. The depth of focus of the optical system 76 is shallower when its magnification is greater or its F number is smaller. Therefore, J needs to be set to a value at which the pitch of movement of the movable table 74 can optimize the depth of focus of the optical system 76 so that a high accuracy of focal point adjustment may be achieved. In the above described apparatus, the number of pulses for a unit is set to a value at which the depth of focus (the extent with which focusing can be realized) of the optical system 76 may be found between 5 and 10 units. The rate of movement at which the movable table 74 is moved each time the stepping motor receives a pulse is set to a value less than $\frac{1}{5}$ to $\frac{1}{10}$ of the depth of focus of the optical system 76.

The number of pulses J for a unit is determined by firstly determining the depth of focus of the optical system 74. The depth of focus D can be geometrically determined by using the formula below.

$$D = \frac{3 \cdot L}{.2 \cdot q \cdot m \cdot \tan(\sin^{-1}(NA))}$$

where

L: horizontal length of the camera 11 (8.8 mm when $\frac{2}{3}$" CCD is used), q: horizontal resolution m: magnification of the optical system 76

NA: number of apertures

When the value of F of the optical system is known, $$D = \frac{3 \cdot L \cdot F}{q \cdot m}$$

Then, the amount of movement ΔZ of the movable table 74 when the stepping motor 80 is driven by a pulse is determined by the following equation.

(amount of movement of moving table by a turn of motor)

$$Z = \frac{x \text{ (rotary angle of motor by a pulse)}}{360}$$

The number of pulses per unit J is set to a value between $\frac{1}{5}$ to $\frac{1}{10}$ of D.

$$J = \frac{D}{(5 \sim 10) \cdot \Delta Z}$$

The extent of detection of the focal point is made greater than the maximum possible positional variance of the work 71 along the x-axis in view of the fact that the moving table is moved by J·ΔZ for a unit.

In other words, the maximum extent of detection of focal point is set to a value with which S·J·ΔZ becomes greater than the maximum possible positional variance.

Figure 23:
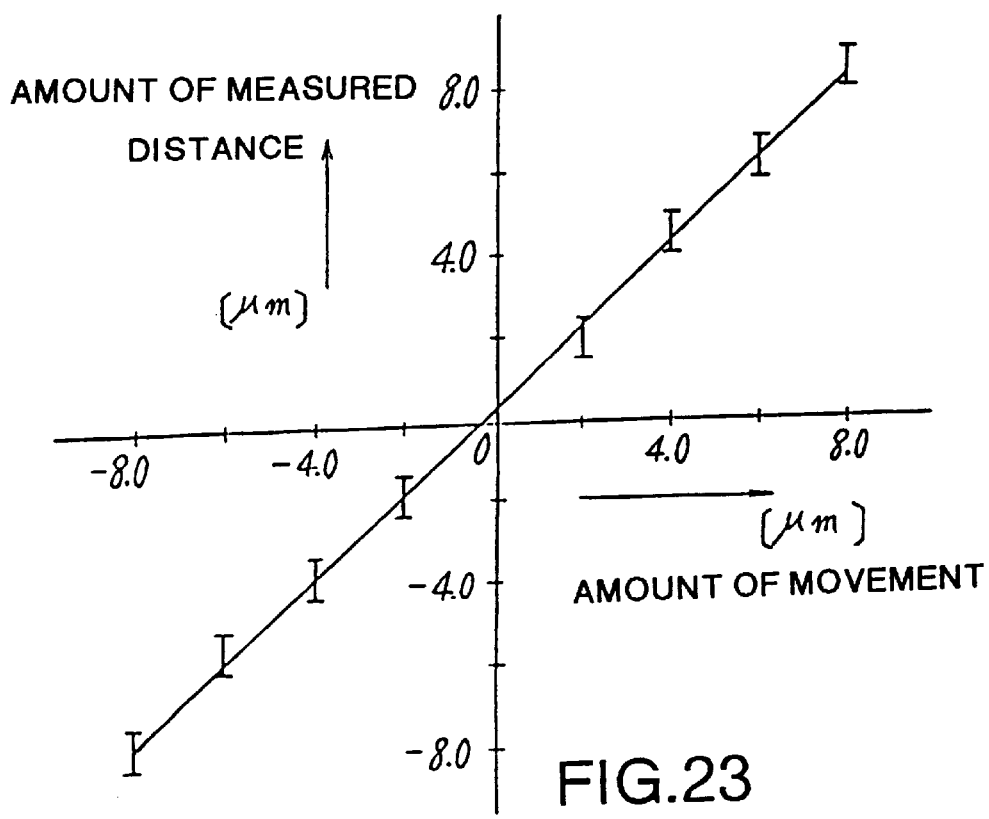
FIG. 23 is a graph showing the relationship between the measured distance and the distance of movement of the focus adjusting section of the apparatus of FIG. 19.
Figure 24:
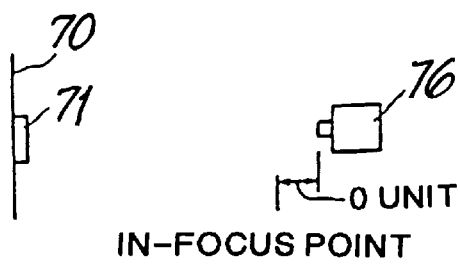
FIG. 24 is a schematic view illustrating the function of parameter O of the apparatus of FIG. 19.

FIG. 23 is a graph showing the relationship between the measured distance and the distance of movement of the focus adjusting section of the apparatus of FIG. 19.

The graph is obtained when m=40, NA=0.5, q=800, D=1.0μm.

The apparatus also employs a parameter 0. The value of the parameter O varies for each work 71 and is set to a value that represents the extent of positional discrepancy between the in-focus position of the apparatus and that of the observer. The optical system 16 is halted to a position displaced by a distance specified by the parameter O from the in-focus of tune apparatus to compensate the positional discrepancy between the in-focus position of the apparatus and that of the observer.

Figure 25:
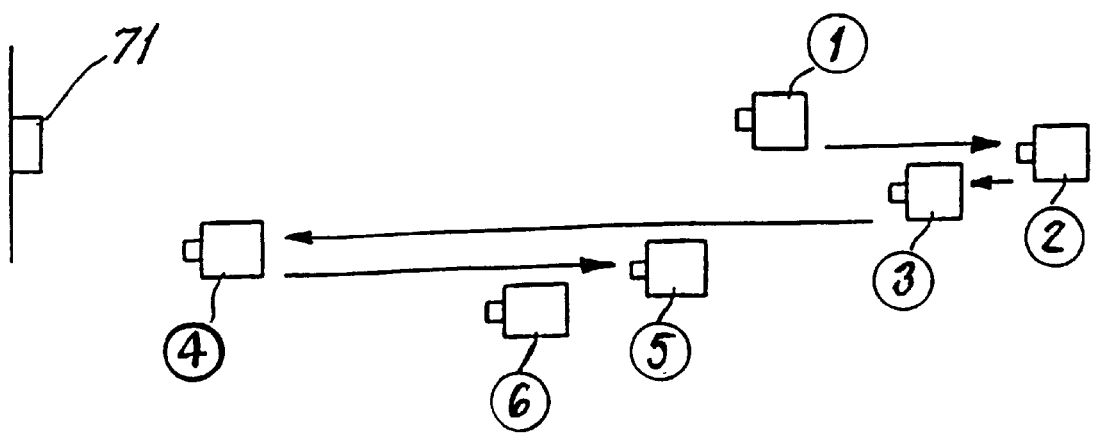
FIG. 25 is a schematic view illustrating the operation of the apparatus of FIG. 19.

The above apparatus is further provided with a feature of removing any backlash of the movable table 74 at the time of focal point adjusting operation by specifying an amount of backlash removing motion that exactly offsets the backlash of the movable table 74. Referring to FIG. 25 which illustrates this feature, when a focal point adjusting operation of the apparatus is started, the optical system 76 is temporarily moved to the right of t origin (in the direction of moving away from the work 71 in FIG. 19) by B units from the current position 1 to position 2 and thereafter moved to the origin 3. With such additional movement, the optical system 76 can be accurately returned to the origin without being affected by backlash. Thereafter, the apparatus is moved to position 4 separated from position 3 by the number of units of the extent of in-focus position detection S to start sampling video signals coming from the camera 11 to determine the in-focus position. Then, the optical system 76 temporarily goes back to position 5 located to the right from the in-focus position by a distance equivalent to (O+B) units and then to position 6 located to the right from the in-focus by a distance equivalent to O units, where it comes to a halt. With such an arrangement, the movable table 74 comes to a halt at a position 6 separated to the right from the origin exactly by a distance equivalent to O unit without being affected by backlash. It may be appreciated that the movable table 74 is made totally free from any backlash by the arrangement of moving the optical system 76 too far to the right by B units and then moving it back to the left by B units.

Figure 26:
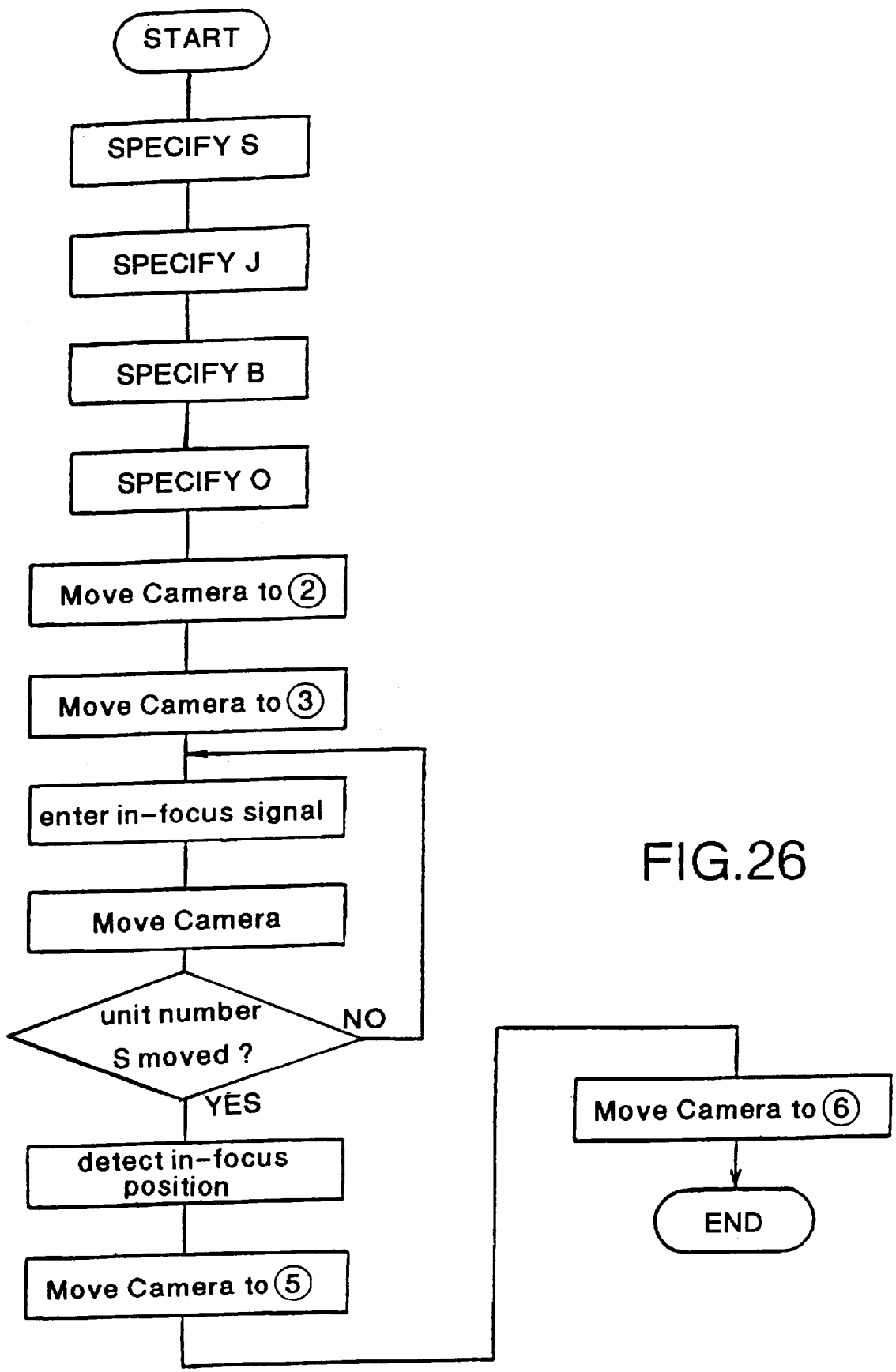
FIG. 26 is a flow chart illustrating the processing operation of the CPU of the apparatus of FIG. 19.

FIG. 26 is a flow chart illustrating the processing operation of the CPU 22 of the apparatus of FIG. 19, said CUP comprising a microcomputer.

Upon receiving a signal given by the operator, the CPU 22 specifies the values of said parameters J, S and O so that the pitch of movement, the amount of backlash and the depth of focus of the optical system 76 are optimally determined by taking into consideration the maximum possible positional discrepancy of the in-focus position to the observer and that to the apparatus. The specified values are stored in the memory 221. After the parameters J, S, O and B are specified, the CPU 22 starts operation of focal point adjustment and temporarily moves the optical system 76 from the current position 1 to position 2 separated to the right from the origin by B units and then to the position of the point of origin 3. Thereafter, the CPU 22 moves the optical system 76 from the point of origin 3 to position 4 separated from the position 3 by the number of units representing the extent of in-focus position detection S while taking up a sample video signal each time five pulses are sent to the stepping motor 80. The CPU 22 then calculates and determines from the collected samples the in-focus position where the subject is focused by the optical system 76. Then, the CPU 22 temporarily moves the optical system 76 from the position 4 to position 5 separated from the in-focus position to the right by a distance equivalent to (O+B) units and then to position 6 located to the right of the in-focus position by a distance equivalent to O units, where the optical system 76 is halted.

The above apparatus is additionally provided with a mechanical limit switch and an electric limit switch for limiting the movement of the movable table 76 so that the extent of in-focus position detection may be defined within the limit of movement. The mechanical and electric limit switches detect that the movable table 74 has reached the limit of movement and transmit respective detection signals. Upon receiving the signals, an extent of movement limiting circuit operates to control the stepping motor 80 so as not to move the movable table 74 beyond the limit of movement.

Since the extent of movement of the movable table 74 and the extent of in-focus position detection of the apparatus can be specified by means of parameters J and S, any changes in the magnification of the optical system 76 and the pitch of movement of the movable table 74 can be accommodated by altering the values of the parameters J and S to provide the apparatus an enhanced level of adaptability. Moreover, since the positional discrepancy between the in-focus position to the apparatus and that of the observer can be exactly compensated by appropriately selecting the value of the parameter O to shift the optical system 76, it is possible to make the two in-focus positions exactly agree with each other. Finally, since the effect of backlash of the movable table 74 be eliminated by appropriately selecting the value of the parameter B, the movable table 14 is totally free from any undesirable effects of backlash.

While the optical system 74 and the camera 11 of the above apparatus are made movable, it may be alternatively so arranged that the optical system 74 and the camera 11 are stationary and the base 70 is driven to move by the stepping motor 80.

With an apparatus according to the invention, in-focus signals from the in-focus signal generating means are stored in the memory of the CPU, which in turn detect the in-focus position of a subject within an area specified by the detecting area selecting section on the basis of the in-focus signals stored in the memory. Therefore, in-focus signals can be obtained within the CPU, meaning that there is no need of providing a sample-hold circuit for each of the scanning lines to be processed so that a compact automatic in-focus signal detecting apparatus can be realized even the number of scanning lines to be processed is increased for high accuracy of detection. Similarly, since there is no need of providing an independent adder, any possibility of a saturated adder is eliminated.

With the above apparatus, the PLL circuit receives a horizontal synchronizing signal and transmits a frequency pulse having a phase that agree with that of the horizontal synchronizing signal it receives so that the output signal is given to the detecting area selecting section and the scanning line selecting section as a pulse to be used for selection of a detection area and a scanning line to be detected. With such an arrangement, the phase of the horizontal synchronizing signal is made to completely agree with that of the pulse to be used for selection of a detection area and a scanning line to be detected and any possible shift of the scanning area can be effectively eliminated. Any possible shift of the scanning area due to variances in the frequency of horizontal synchronizing signal among cameras can be effectively prevented.

The provision of peak-hold circuits for detecting the peak values of the high frequency components of video signals within the in-focus state detecting area and integrating circuits for integrating the obtained high frequency components allows the obtained peak values and integrated values to be selectively used depending on the condition where the subject is placed and, on certain occasions, the peak values and the integrated values may be used after multiplying them with appropriate respective factors. Such operation of multiplication may be particularly advantageous because an accurate in-focus position detection signal having a sharp peak can be obtained to produce a highly accurate in-focus signal even when the video signal shows a poor contrast and the output of the peak-hold circuits is held to a low level.

Since the above described apparatus has a rising timing of the gate that control passage of video signals delayed from that of the in-focus signal detecting circuit and a failing timing of the in-focus signal detecting circuit preceding that of the gate, the rising and falling edges of the video output signal that carry transient noise are cut of f to produce a video output signal that is free from any transient noise so that highly accurate automatic focusing can be achieved by using accurate in-focus signals that are not affected by transient noise.

According to an aspect of the present invention, there is provided an automatic focusing apparatus comprising image pickup means for taking an image of a subject supported on a support by way of an optical system and transmitting an video signal for the image, means for specifying an in-focus position detecting area and a pitch of movement of focusing means, means for extracting a portion of the video signal transmitted from said image pickup means corresponding to the pitch of movement of focusing means specified by the above means and drive means for driving either the support or the optical system for focal point adjustment depending on the result of the extracting operation of the extracting means. With such an arrangement, any changes in the magnification of the optical system or in the pitch of movement of either the optical system or the support can be accommodated by simply changing some or all of the above described parameters.

A preferred embodiment of the present invention comprises means for removing backlash that preliminarily move either the support or the optical system by the amount of backlash in order to eliminate any undesired influence of backlash.

Another preferred embodiment of the present invention comprises means for correcting any positional discrepancy between the in-focus position obtained by said focal point detecting means and the in-focus position for the observer in order to make the two in-focus positions agree with each other.

While the foregoing description and drawings represent the preferred embodiments of the present invention, it will be obvious to those skilled in the art that various changes and modifications may be made therein without departing from the true spirit and scope of the present invention.

What is claimed is:

1. An automatic focusing apparatus for use with an optical system, comprising:

image pickup means for picking up an image of a subject supported on a support of an optical system and for transmitting video signals corresponding to the picked up image of the subject;

control means operable to receive the video signals transmitted by said image pickup means and for setting a sampling area for in-focus state detection; and drive means coupled to said image pickup means for moving said image pickup means towards and away from said support of said optical system, a rate of movement being set to a value less than a depth of focus of the image pickup means;

said control means controlling said drive means to move said image pickup means initially to a predetermined initial position located away from said support, then controlling said drive means to move said image pickup means from said predetermined initial position towards said support to a predetermined end position located nearest said support, said control means sampling a plurality of video signals transmitted by said image pickup means when said image pickup means is moved from said predetermined initial position to said predetermined end position, said control means detecting an in-focus position of the sampling area of the subject from the sampled video signals, and said control means controlling said drive means to move said image pickup means to the determined in-focus position.

2. An automatic focusing apparatus according to claim 1, wherein said control means is operable to remove an effect of backlash by controlling said drive means to move said image pickup means to a position beyond said predetermined initial position relative to a position of said support by an amount equivalent to the backlash.

3. An automatic focusing apparatus according to claim 1, wherein said control means is operable to remove an effect of positional discrepancy of the in-focus position and an observer's in-focus position.

4. An automatic focusing apparatus according to claim 1, wherein the rate of movement of said drive means is set to a value less than $1/5$ to $1/10$ of the depth of focus of the optical system.

5. An automatic focusing apparatus according to claim 1, wherein said control means detects the in-focus position of the sampling area of the subject only from the video signals sampled during the time said image pickup means is moved from said predetermined initial position to said predetermined end position.

6. An automatic focusing apparatus according to claim 1, wherein said control means does not determine the in-focus position of the sampling area until after the image pickup means is moved to said predetermined end position.

* * * * *